No. 631,804. Patented Aug. 29, 1899.
B. A. MANLEY.
BALL CASTER.
(Application filed Oct. 27, 1898.)

(No Model.)

Witnesses:
E. Behel.
J. P. Taylor

Inventor:
Barney A. Manley
By A. O. Behel
Atty

UNITED STATES PATENT OFFICE.

BARNEY A. MANLEY, OF ROCKFORD, ILLINOIS.

BALL-CASTER.

SPECIFICATION forming part of Letters Patent No. 631,804, dated August 29, 1899.

Application filed October 27, 1898. Serial No. 694,756. (No model.)

*To all whom it may concern:*

Be it known that I, BARNEY A. MANLEY, a citizen of the United States, residing at Rockford, in the county of Winnebago and State of Illinois, have invented certain new and useful Improvements in Ball-Casters, of which the following is a specification.

The object of this invention is to support a series of balls in suitable cavities and against which a larger ball rests, the larger ball held from displacement by a ring.

Figure 1:
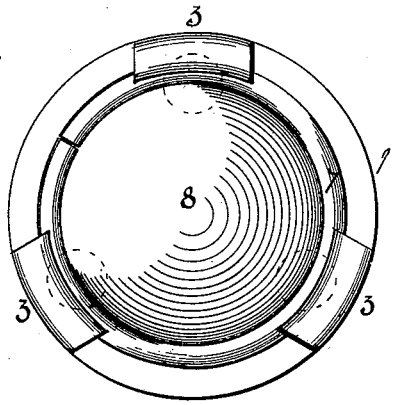
Figure 2:
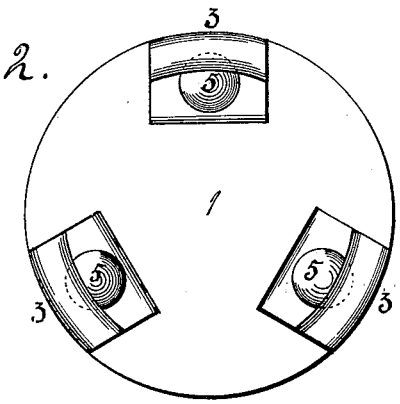
Figure 3:
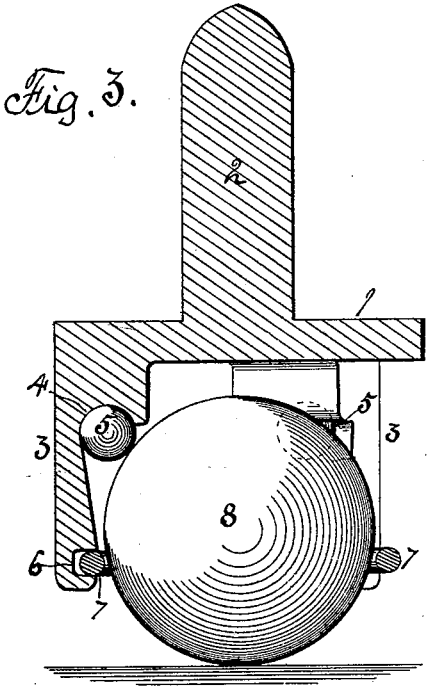

In the accompanying drawings, Figure 1 is an under face representation of my improved caster. Fig. 2 is a similar view in which the large ball and ring have been removed. Fig. 3 is a vertical section.

The main portion of the caster consists of the base 1, shank 2, and three arms 3, depending from the base. Each of the arms has a spherical recess 4, within which is located a ball 5, the free ends of the arms each having a horizontal recess 6. An open ring 7 is placed in the recess 6 of the arms. A ball 8, of a diameter greater than the inside diameter of the ring, is forced into position through the ring, the ring yielding sufficiently to allow of its insertion and the recess 6 permitting the ring to expand, and after the ball is in position against the balls 5 the ring 7 will close and prevent the ball 8 from falling out. The shank of the caster is placed in the article of furniture to be supported, and the large ball 8 will rest upon the floor and against the series of balls 5, supported by the arms 3, thereby forming an antifriction-support for the larger ball. The larger ball will not engage the ring 7 when in use, as shown at Fig. 3, and the ring is for the sole purpose of preventing the ball from falling out when the article of furniture is lifted.

I claim as my invention—

A ball-caster composed of a circular base, three arms depending from the base having enlargements at the base and semispherical recesses formed in the enlargements, each arm having a groove near its outer end, balls located in the recesses, an open ring located in the grooves of the arms and a larger ball capable of rolling in connection with the balls and adapted to pass through the ring after the ring is in position in the arms.

BARNEY A. MANLEY.

Witnesses:
A. O. BEHEL,
E. BEHEL.